US011792102B2

(12) United States Patent
Gomaa et al.

(10) Patent No.: US 11,792,102 B2
(45) Date of Patent: Oct. 17, 2023

(54) SYSTEM AND METHOD FOR IMPLEMENTING A HIGH DENSITY SESSION MANAGEMENT MODULE

(71) Applicant: JPMorgan Chase Bank, N.A., New York, NY (US)

(72) Inventors: Hamdi Gomaa, Katy, TX (US); Srinandan SP, Bangalore (IN); Prashanth Gudepu, Miyapur (IN); Arvind Bhanushali, Houston, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 48 days.

(21) Appl. No.: 17/455,324

(22) Filed: Nov. 17, 2021

(65) Prior Publication Data

US 2023/0103564 A1    Apr. 6, 2023

(30) Foreign Application Priority Data

Oct. 5, 2021    (IN) .............................. 202111045171

(51) Int. Cl.
*H04L 43/0876* (2022.01)
*H04L 67/14* (2022.01)
(52) U.S. Cl.
CPC .......... *H04L 43/0876* (2013.01); *H04L 67/14* (2013.01)

(58) Field of Classification Search
CPC ........................... H04L 43/0876; H04L 67/14
See application file for complete search history.

(56) References Cited

U.S. PATENT DOCUMENTS

| | | | |
|---|---|---|---|
| 2020/0348964 A1* | 11/2020 | Anand | G06F 9/5005 |
| 2021/0211506 A1* | 7/2021 | Kim | G06F 9/452 |
| 2022/0258346 A1* | 8/2022 | Hall | B25J 9/1661 |
| 2022/0308554 A1* | 9/2022 | Arora | G06Q 10/0631 |

* cited by examiner

*Primary Examiner* — June Sison
(74) *Attorney, Agent, or Firm* — GREENBLUM & BERNSTEIN, P.L.C.

(57) ABSTRACT

Various methods, apparatuses/systems, and media for implementing a high density session manager (HDSM) module are disclosed. A processor creates a master session in response to receiving login input data from an HDSM master module; accesses, in response to creating the master session, a configuration database that stores configuration file and logging information data corresponding to a plurality of child sessions each including corresponding functional user identifier (ID); retrieves the configuration file and logging information data from the configuration database; dynamically creates, based on the retrieved configuration file and log information data, multiple simultaneous and interactive server sessions among the plurality of child sessions; and runs the dynamically created multiple simultaneous and interactive server sessions on a single server. Each server session runs with a separately logged in functional user ID. The processor also monitors health of each server session running on the single server.

20 Claims, 6 Drawing Sheets

SYSTEM AND METHOD FOR IMPLEMENTING A HIGH DENSITY SESSION MANAGEMENT MODULE

CROSS-REFERENCE TO RELATED APPLICATIONS

This application claims the benefit of priority from Indian Provisional Patent Application No. 202111045171, filed Oct. 5, 2021, which is herein incorporated by reference in its entirety.

TECHNICAL FIELD

This disclosure generally relates to multiple interactive session management, and, more particularly, to methods and apparatuses for implementing a high density session manager module for creating multiple concurrent interactive sessions so that multiple software robots (BOTS) can run independently on a single server at the same time.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Applications typically require infrastructure resources such as servers, databases, load balancers, message queues, storages etc. in order to function. Typically, these infrastructure resources need to be provided at the time of application startup. Modern applications may need to access a number of infrastructure resources in order to provide useful functionality. For example, due to a limitation in the number of concurrent interactive sessions that are permitted per virtual server, executing BOTS may require a large number of virtual servers because of their dependency on interactive windows sessions. Typically, a robotics team for a large organization such JPMorgan and Chase often requires over eight hundreds virtual servers to run all their BOTs, and more were being added monthly to keep up with the demand. Most of the servers were only able to manage one bot execution at a time due to the limitation of interactive actions by the bots. All these servers were being underutilized with an average CPU and memory uses of below 20%, thereby resulting enormous under-utilization of the CPU and memory and increasing cost to govern and maintain such a large infrastructure.

Thus, there is a need for an advanced tool that can optimize the hardware footprint, reduce the time to market, build a scalable on-demand infrastructure, and reduce the costs of robotic process automation.

SUMMARY

The present disclosure, through one or more of its various aspects, embodiments, and/or specific features or sub-components, provides, among other features, various systems, servers, devices, methods, media, programs, and platforms for implementing a high density session management module for creating multiple concurrent interactive sessions so that multiple software robots (BOTS) can run on a single server at the same time, thereby streamlining the hardware footprint (i.e., reducing the number of servers, maximizing utilization of server CPU and memory, etc., but the disclosure is not limited thereto), reducing the time to market an application, building a scalable on-demand infrastructure, and reducing the costs of robotic process automation, but the disclosure is not limited thereto.

For example, the present disclosure, through one or more of its various aspects, embodiments, and/or specific features or sub-components, provides, among other features, various systems, servers, devices, methods, media, programs, and platforms for implementing a high density session manager module that can provide the following functionalities, but the disclosure is not limited thereto: configure a session manager with self-healing feature to auto initiate lost session; execute high density session manager RESTful service for dynamic high density session configuration; execute high density session manager application programming interface (API) for configuration management; execute self-service web portal to onboard new servers and monitor key performance indicators (KPIs); execute high density session manager logger to collect vital statistics and exceptions; execute high density session manager database objects for persistent state data, etc.

According to an aspect of the present disclosure, the architecture of the high density session management module may be designed in a manner such that the architecture supports fault tolerant design with service oriented architecture and such that micro-services may be utilized by other applications and tools.

According to an aspect of the present disclosure, a method for implementing a high density session management module by utilizing one or more processors and one or more memories is disclosed. The method may include: creating a master session with automated log-on feature in response to receiving login input data from a high density session manager master module; accessing, in response to creating the master session, a configuration database that stores configuration file and logging information data corresponding to a plurality of child sessions each including corresponding functional user identifier (ID); retrieving the configuration file and logging information data from the configuration database; dynamically creating, based on the retrieved configuration file and logging information data, retrieving the credentials of the functional user IDs from a central secure vault, multiple simultaneous and interactive server sessions among the plurality of child sessions; running the dynamically created multiple simultaneous and interactive server sessions on a single server, wherein each server session is running with a separately logged in functional user ID; and monitoring health of each server session running on the single server.

According to yet another aspect of the instant disclosure, the method may further include: creating the multiple simultaneous and interactive server sessions in a manner such that a plurality of software robots can run on the single server at the same time.

According to a further aspect of the instant disclosure, the method may further include: creating the multiple simultaneous and interactive server sessions in a manner such that all created server sessions are capable of simultaneously running one or more non-conflicting software robots.

According to an additional aspect of the instant disclosure, the method may further include: receiving a user input to add a new server session; dynamically creating the new server session in response to receiving the user input; and adding the newly created server session on the single server on which the previously created multiple simultaneous and interactive server sessions are already running.

According to yet another aspect of the instant disclosure, wherein, in dynamically creating multiple simultaneous and interactive server sessions, the method may further include: using a loop-back internet protocol (IP) address session on the same single server by causing the high density session manager master module implement remote desktop protocol itself without utilizing other jump host servers. Typically, for such solutions sessions are created by a remote servers (jump host servers), but in this solution, the master session will create multiple concurrent child sessions on the same server.

According to yet another aspect of the instant disclosure, wherein the health of each server session includes connection status, and the method may further include: constantly monitoring connection status of each server session among the multiple simultaneous and interactive server sessions within a predefined timeframe; detecting, in response to monitoring, a disconnected session; and automatically recreating the disconnected session upon detection of disconnected status based on the retrieved configuration file data and logging information data.

According to a further aspect of the instant disclosure, wherein the high density session manager master module may include the configuration database, a health monitor module, a RESTful service module, and a backup file system, and the method may further include: monitoring, by utilizing the health monitor module, connection status of each server session among the multiple simultaneous and interactive server sessions; retrieving, by utilizing RESTful service module, the configuration file from the configuration database; storing operation logs received from a logger service module onto a central database; and storing server specific configuration file onto the backup file system configured for consumed by the health monitor module.

According to another aspect of the instant disclosure, a system for implementing a high density session manager module is disclosed. The system may include: a processor; and a memory operatively connected to the processor via a communication interface, the memory storing computer readable instructions, when executed, may cause the processor to: create a master session in response to receiving login input data from a high density session manager master module; access, in response to creating the master session, a configuration database that stores configuration file and logging information data corresponding to a plurality of child sessions each including corresponding functional user identifier (ID); retrieve the configuration file and logging information data from the configuration database; dynamically create, based on the retrieved configuration file and log information data, multiple simultaneous and interactive server sessions among the plurality of child sessions; run the dynamically created multiple simultaneous and interactive server sessions on a single server, wherein each server session is running with a separately logged in functional user ID; and monitor health of each server session running on the single server.

According to yet another aspect of the instant disclosure, the processor may be further configured to create the multiple simultaneous and interactive server sessions in a manner such that a plurality of software robots can run on the single server at the same time.

According to a further aspect of the instant disclosure, the processor may be further configured to create the multiple simultaneous and interactive server sessions in a manner such that all created server sessions are capable of simultaneously running one or more non-conflicting software robots.

According to yet another aspect of the instant disclosure, the processor may be further configured to: receive a user input to add a new server session; dynamically create the new server session in response to receiving the user input; and add the newly created server session on the single server on which the previously created multiple simultaneous and interactive server sessions are already running.

According to a further aspect of the present disclosure, in dynamically creating multiple simultaneous and interactive server sessions, the processor may be further configured to: create a loop-back internet protocol (IP) address session on the same single server by causing the high density session manager master module implement remote desktop protocol itself without utilizing other jump host servers.

According to another aspect of the present disclosure, the health of each server session includes connection status, and the processor may be further configured to: constantly monitor connection status of each server session among the multiple simultaneous and interactive server sessions within a predefined timeframe; detect, in response to monitoring, a disconnected session; and automatically recreate the disconnected session upon detection of disconnected status based on the retrieved configuration file data and logging information data.

According to a further aspect of the present disclosure, the high density session manager master module includes the configuration database, a health monitor module, a RESTful service module, and a backup file system, and the processor may be further configured to: monitor, by utilizing the health monitor module, connection status of each server session among the multiple simultaneous and interactive server sessions; retrieve, by utilizing RESTful service module, the configuration file from the configuration database; store operation logs received from a logger service module onto a central database; and store server specific configuration file onto the backup file system configured for consumed by the health monitor module.

According to yet another aspect of the present disclosure, a non-transitory computer readable medium configured to store instructions for implementing a high density session manager module is disclosed. The instructions, when executed, may cause a processor to perform the following: creating a master session in response to receiving login input data from a high density session manager master module; accessing, in response to creating the master session, a configuration database that stores configuration file and logging information data corresponding to a plurality of child sessions each including corresponding functional user identifier (ID); retrieving the configuration file and logging information data from the configuration database; dynamically creating, based on the retrieved configuration file and logging information data, multiple simultaneous and interactive server sessions among the plurality of child sessions; running the dynamically created multiple simultaneous and interactive server sessions on a single server, wherein each server session is running with a separately logged in functional user ID; and monitoring health of each server session running on the single server.

According to yet another aspect of the instant disclosure, the instructions, when executed, may further cause the processor to perform the following: creating the multiple simultaneous and interactive server sessions in a manner such that a plurality of software robots can run on the single server at the same time.

According to a further aspect of the instant disclosure, the instructions, when executed, may further cause the processor to perform the following: creating the multiple simultaneous and interactive server sessions in a manner such that all created server sessions are capable of simultaneously running one or more non-conflicting software robots.

According to an additional aspect of the instant disclosure, the instructions, when executed, may further cause the processor to perform the following: receiving a user input to add a new server session; dynamically creating the new server session in response to receiving the user input; and adding the newly created server session on the single server on which the previously created multiple simultaneous and interactive server sessions are already running.

According to yet another aspect of the instant disclosure, in dynamically creating multiple simultaneous and interactive server sessions, the instructions, when executed, may further cause the processor to perform the following: creating a loop-back internet protocol (IP) address session on the same single server by causing the high density session manager master module implement remote desktop protocol itself without utilizing other jump host servers.

According to yet another aspect of the instant disclosure, the health of each server session includes connection status, and the instructions, when executed, may further cause the processor to perform the following: constantly monitoring connection status of each server session among the multiple simultaneous and interactive server sessions within a predefined timeframe; detecting, in response to monitoring, a disconnected session; and automatically recreating the disconnected session upon detection of disconnected status based on the retrieved configuration file data and logging information data.

According to a further aspect of the instant disclosure, the high density session manager master module may include the configuration database, a health monitor module, a RESTful service module, and a backup file system, and the instructions, when executed, may further cause the processor to perform the following: monitoring, by utilizing the health monitor module, connection status of each server session among the multiple simultaneous and interactive server sessions; retrieving, by utilizing RESTful service module, the configuration file from the configuration database; storing operation logs received from a logger service module onto a central database; and storing server specific configuration file onto the backup file system configured for consumed by the session manager module.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
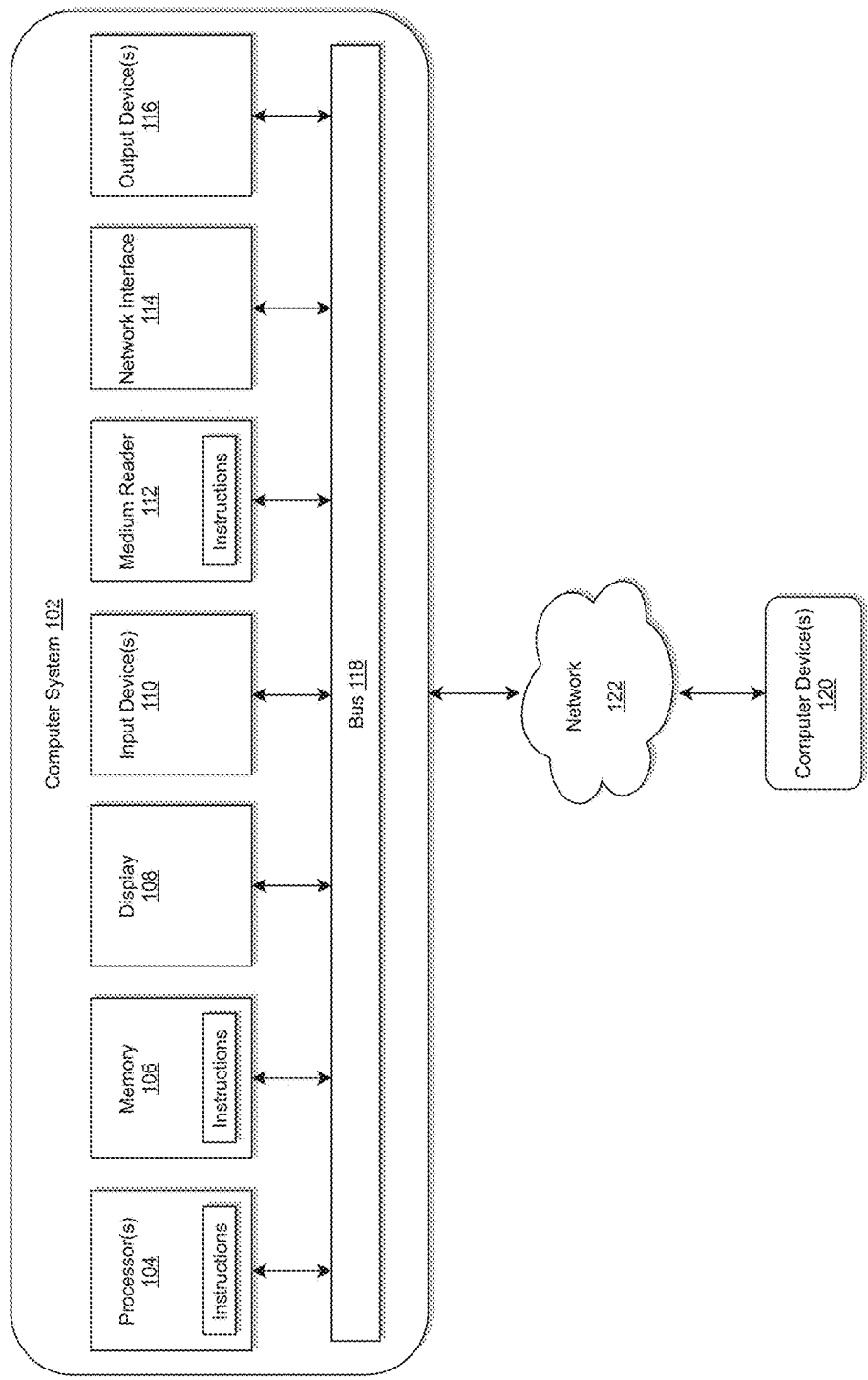
FIG. 1 illustrates a computer system for implementing a high density session management module for creating multiple concurrent interactive sessions so that multiple BOTS can run on a single server at the same time in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a high density session management module for creating multiple concurrent interactive sessions so that multiple BOTS can run on a single server at the same time in accordance with the embodiments described herein, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
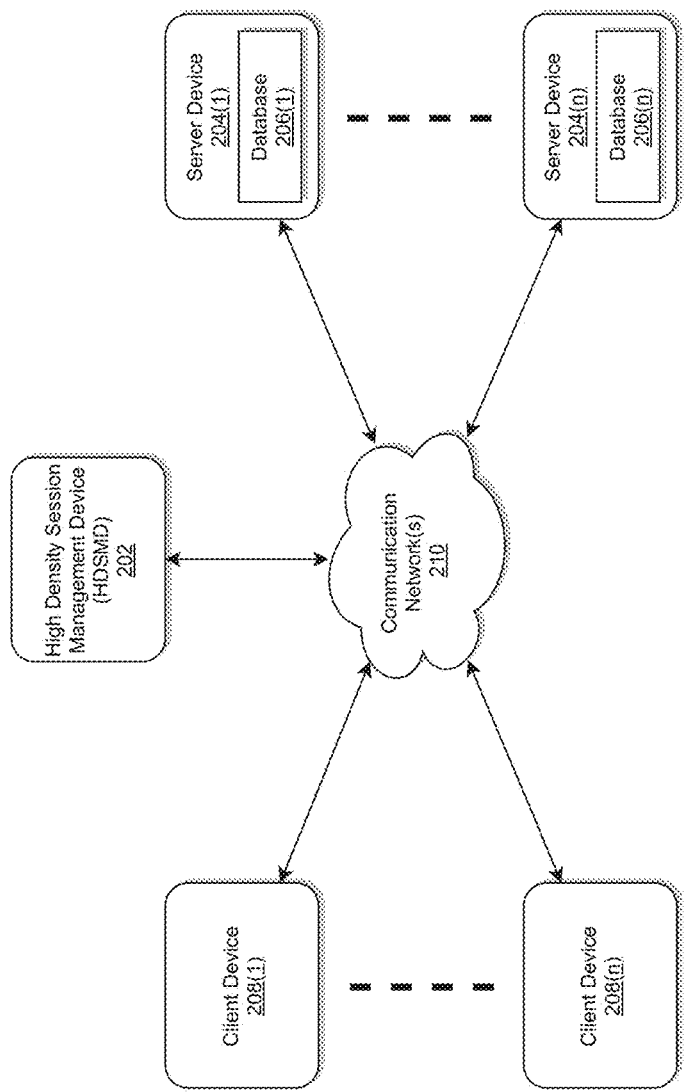
FIG. 2 illustrates an exemplary diagram of a network environment with a high density session management device in accordance with an exemplary embodiment.

Referring to FIG. 2, a schematic of an exemplary network environment 200 for implementing a high density session management device (HDSMD) of the instant disclosure is illustrated.

According to exemplary embodiments, the above-described problems associated with conventional approach of session management may be overcome by implementing a HDSMD 202 as illustrated in FIG. 2 that may create multiple concurrent interactive sessions so that multiple BOTS can run on a single server at the same time, thereby streamlining the hardware footprint (i.e., reducing the number of servers, maximizing utilization of server CPU and memory, etc., but the disclosure is not limited thereto), reducing the time to market an application, building a scalable on-demand infrastructure for an application, and reducing the costs of robotic process automation, but the disclosure is not limited thereto.

The HDSMD 202 may be the same or similar to the computer system 102 as described with respect to FIG. 1.

The HDSMD 202 may store one or more applications that can include executable instructions that, when executed by the HDSMD 202, cause the HDSMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the HDSMD 202 itself, may be located in virtual server(s) running in a cloud-based computing environment rather than being tied to one or more specific physical network computing devices. Also, the application(s) may be running in one or more virtual machines (VMs) executing on the HDSMD 202. Additionally, in one or more embodiments of this technology, virtual machine(s) running on the HDSMD 202 may be managed or supervised by a hypervisor.

In the network environment 200 of FIG. 2, the HDSMD 202 is coupled to a plurality of server devices 204(1)-204(n) that hosts a plurality of databases 206(1)-206(n), and also to a plurality of client devices 208(1)-208(n) via communication network(s) 210. A communication interface of the HDSMD 202, such as the network interface 114 of the computer system 102 of FIG. 1, operatively couples and communicates between the HDSMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the HDSMD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The HDSMD 202 may be a standalone device or integrated with one or more other devices or apparatuses, such as one or more of the server devices 204(1)-204(n), for example. In one particular example, the HDSMD 202 may be hosted by one of the server devices 204(1)-204(n), and other arrangements are also possible. Moreover, one or more of the devices of the HDSMD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the HDSMD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the HDSMD 202 that may efficiently provide a platform for creating multiple concurrent interactive sessions so that BOTS can run on a single server at the same time, thereby streamlining the hardware footprint (i.e., reducing the number of servers, maximizing utilization of server CPU and memory, etc., but the disclosure is not limited thereto), reducing the time to market an application, building a scalable on-demand infrastructure, and reducing the costs of robotic process automation, but the disclosure is not limited thereto.

The client devices 208(1)-208(n) may run interface applications, such as standard web browsers or standalone client applications, which may provide an interface to communicate with the HDSMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the HDSMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the HDSMD 202, the server devices 204(1)-204(n), or the client devices 208(1)-208(n), for example, may be configured to operate as virtual instances on the same physical machine. For example, one or more of the HDSMD 202, the server devices 204(1)-204 (n), or the client devices 208(1)-208(n) may operate on the same physical device rather than as separate devices communicating through communication network(s) 210. Additionally, there may be more or fewer HDSMDs 202, server devices 204(1)-204(n), or client devices 208(1)-208(n) than illustrated in FIG. 2. According to exemplary embodiments, the HDSMD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
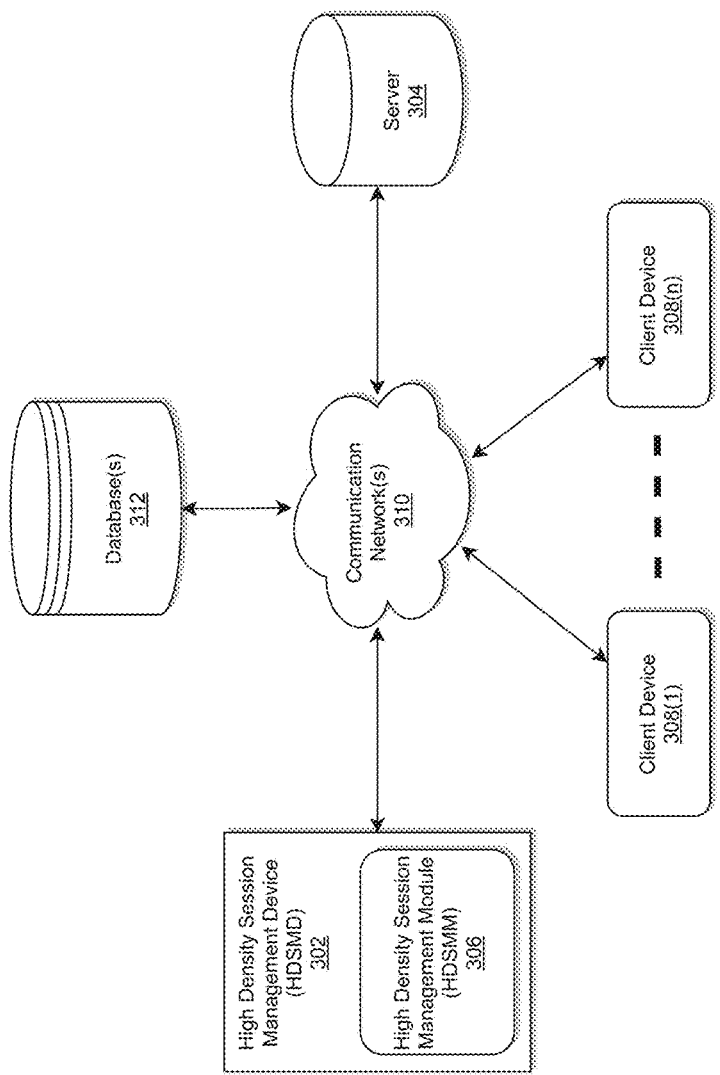
FIG. 3 illustrates a system diagram for implementing a high density session management device having a high density session management module in accordance with an exemplary embodiment.

FIG. 3 illustrates a system diagram for implementing a platform and language agnostic high density session management device (HDSMD) having a platform and language agnostic high density session management module (HDSMM) in accordance with an exemplary embodiment.

As illustrated in FIG. 3, the system 300 may include a HDSMD 302 within which a HDSMM 306 is embedded, a server 304, a database(s) 312, a plurality of client devices 308(1) . . . 308(n), and a communication network 310. The database(s) 312 may be also referred to as a configuration and log database.

According to exemplary embodiments, the HDSMD 302 including the HDSMM 306 may be connected to the server 304, and the database(s) 312 via the communication network 310. The HDSMD 302 may also be connected to the plurality of client devices 308(1) . . . 308(n) via the communication network 310, but the disclosure is not limited thereto. The client devices 308(1) . . . 308(n) may be the same or similar to the client devices 208(1) . . . 208(n)

According to exemplary embodiment, the HDSMD 302 is described and shown in FIG. 3 as including the HDSMM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the HDSMM 306 may be configured to receive real-time feed of data from the plurality of client devices 308(1) . . . 308(n) via the communication network 310.

As will be described below, the HDSMM 306 may be configured to create a master session in response to receiving login input data from a high density session management (HDSM) master module by utilizing the client devices 308(1) . . . 308(n); access, in response to creating the master session, a configuration database (i.e., database(s) 312) that stores configuration file and logging information data corresponding to a plurality of child sessions (may also be referred to as broker sessions) each including corresponding functional user identifier (ID); retrieve the configuration file and logging information data from the configuration database (i.e., database(s) 312); dynamically create, based on the retrieved configuration file and log information data, multiple simultaneous and interactive server sessions among the plurality of child sessions; run the dynamically created multiple simultaneous and interactive server sessions on a single server (i.e., server 304), wherein each server session is running with a separately logged in functional user ID; and monitor health of each server session running on the single server (i.e., server 304), but the disclosure is not limited thereto.

The plurality of client devices 308(1) . . . 308(n) are illustrated as being in communication with the HDSMD 302. In this regard, the plurality of client devices 308(1) . . . 308(n) may be "clients" of the HDSMD 302 and are described herein as such. Nevertheless, it is to be known and understood that the plurality of client devices 308(1) . . . 308(n) need not necessarily be "clients" of the HDSMD 302, or any entity described in association therewith herein. Any additional or alternative relationship may exist between either or both of the plurality of client devices 308(1) . . . 308(n) and the HDSMD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the HDSMD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The HDSMD 302 may be the same or similar to the HDSMD 202 as described with respect to FIG. 2, including any features or combination of features described with respect thereto.

Figure 4:
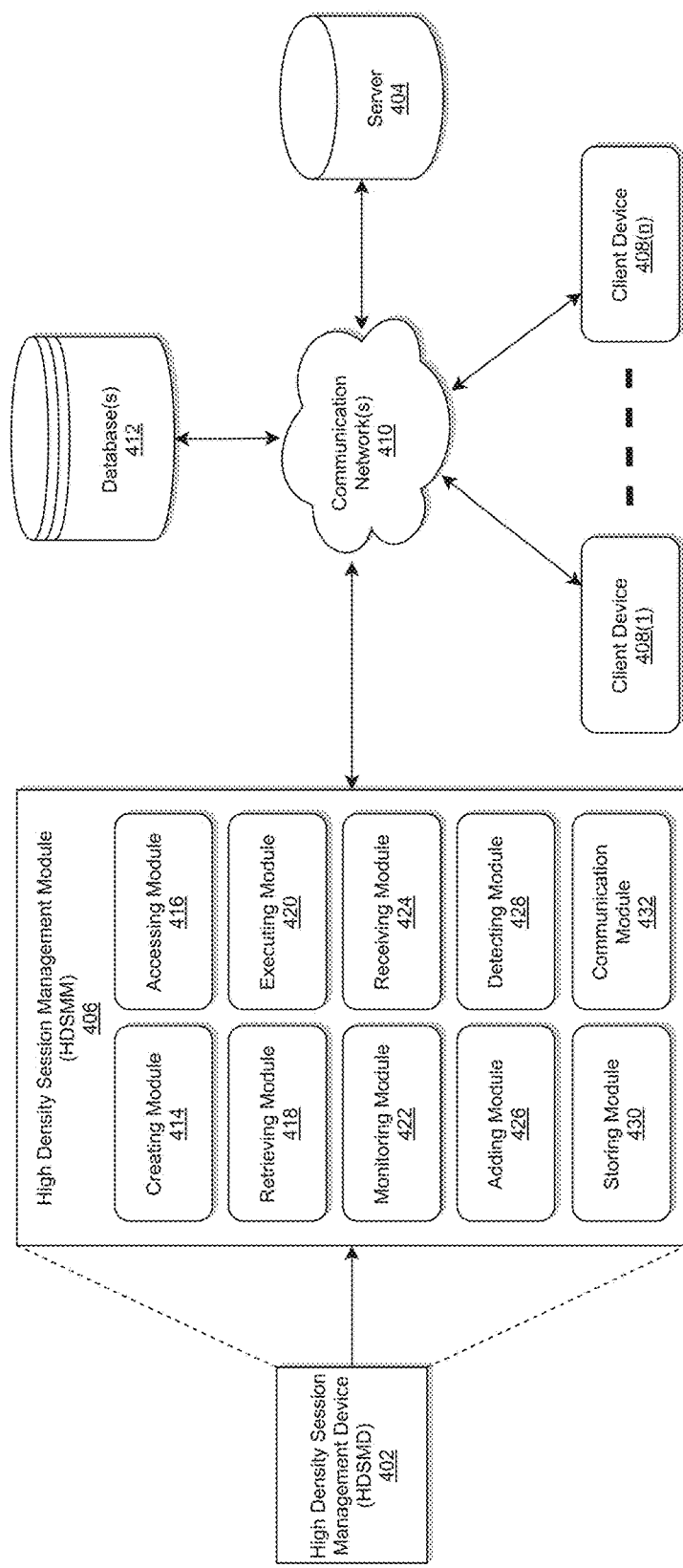
FIG. 4 illustrates a system diagram for implementing a high density session management module of FIG. 3 in accordance with an exemplary embodiment.

FIG. 4 illustrates a system diagram for implementing a platform and language agnostic resiliency module (HDSMM) of FIG. 3 in accordance with an exemplary embodiment.

According to exemplary embodiments, the system 400 may include a platform and language agnostic high density session management device (HDSMD) 402 within which a HDSMM 406 is embedded, a server 404, database(s) 412, and a communication network 410.

According to exemplary embodiments, the HDSMD 402 including the HDSMM 406 may be connected to the server 404 and the database(s) 412 via the communication network 410. The HDSMD 402 may also be connected to the plurality of client devices 408(1)-408(n) via the communication network 410, but the disclosure is not limited thereto. The HDSMM 406, the server 404, the plurality of client devices 408(1)-408(n), the database(s) 412, the communication network 410 as illustrated in FIG. 4 may be the same or similar to the HDSMM 306, the server 304, the plurality of client devices 308(1)-308(n), the database(s) 312, the communication network 310, respectively, as illustrated in FIG. 3.

According to exemplary embodiments, as illustrated in FIG. 4, the HDSMM 406 may include a creating module 414, an accessing module 416, a retrieving module 418, an executing module 420, a monitoring module 422, a receiving module 424, an adding module 426, a detecting module 428, a storing module 430, and a communication module 432.

Figure 5:
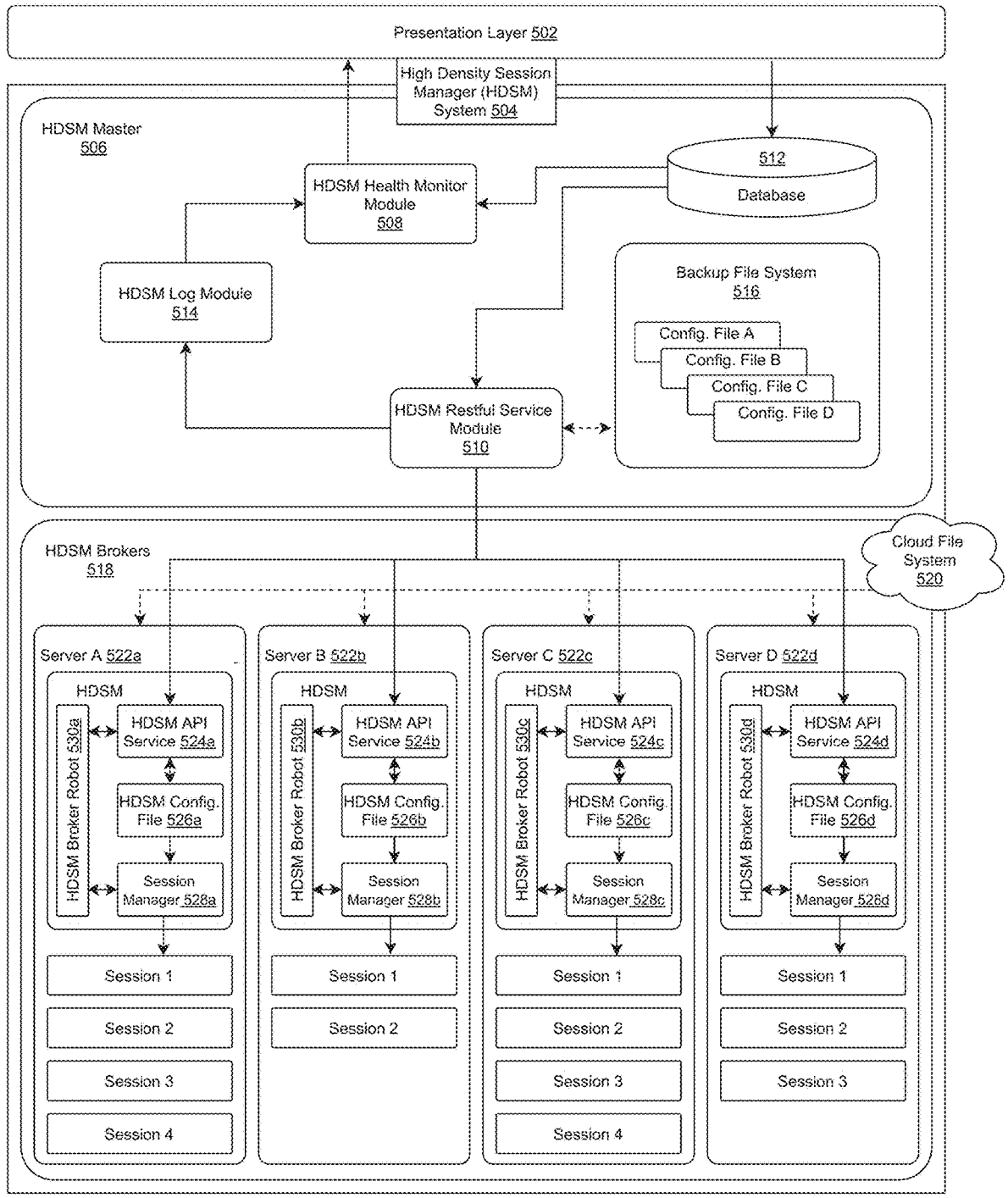
FIG. 5 illustrates an exemplary architecture implemented by the high density session management module of FIG. 4 in accordance with an exemplary embodiment.

According to exemplary embodiments, FIG. 5 illustrates an exemplary system architecture 500 implemented by the HDSMM 406 of FIG. 4 in accordance with an exemplary embodiment.

As illustrated in FIG. 5, the exemplary system architecture may include a presentation layer 502, a high density session manager (HDSM) system 504 which may include an HDSM master 506 and a plurality of HDSM brokers 518, but the disclosure is not limited thereto.

According to exemplary embodiments, the HDSM master 506 may include an HDSM health monitor module 508, an HDSM Restful service module 510, a database 512 (i.e., a configuration and log database), an HDSM log module 514, and a backup file system 516, but the disclosure is not limited thereto.

According to exemplary embodiments, the plurality of HDSM brokers 518 may include a cloud file system 520, a plurality of servers, e.g., server A 522a, server B 522b, server C 522c, and server D 522d. Although only four servers are illustrated in FIG. 5, the disclosure is not limited thereto. Any number of desired servers may be implemented depending on high density sessions.

According to exemplary embodiments, each of the server A 522a, server B 522b, server C 522c, and server D 522d may include corresponding HDSM that may include an HDSM broker robot, an HDSM API service, an HDSM configuration file, and a session monitor, but the disclosure is not limited thereto. For example, the HDSM of server A 522a may include an HDSM broker robot 530a, an HDSM API service 524a, an HDSM configuration file 526a, and a session manager 528a; the HDSM of server B 522b may include an HDSM broker robot 530b, an HDSM API service 524b, an HDSM configuration file 526b, and a session manager 528b; the HDSM of server C 522c may include an HDSM broker robot 530c, an HDSM API service 524c, an HDSM configuration file 526c, and a session manager 528c; and the HDSM of server D 522d may include an HDSM broker robot 530d, an HDSM API service 524d, an HDSM configuration file 526d, and a session manager 528d.

According to exemplary embodiments, after creation of a master session by the HDSM master 506 the data from various components of the HDSM system 504 may flow in the following manner, but the disclosure is not limited thereto. For example, data from the presentation layer 502 may flow to the database 512 (i.e., configuration and log database). Data from the database 512 may flow to the HDSM health monitor module 508 and the HDSM Restful service module 510. Data from the HDSM Restful service module 510 may flow to the HDSM log module 514, the backup file system 516 which includes the configuration files A, B, C, D, and to each of the HDSM API service 524a, 524b, 524c, and 524d. Data from the backup file system 516 may also flow to the HDSM Restful service module 510. Data from the HDSM log module 514 may flow to the HDSM health monitor module 508 and data from the HDSM health monitor module 508 may flow to the presentation layer 502 for consumption by the database 512.

According to exemplary embodiments, within the plurality of HDSM brokers 518, data may flow in the following manner, but the disclosure is not limited thereto. For example each of the server A 522a, server B 522b, server C 522c, server D 522d may receive data from the cloud file system 520. Data may flow in a bidirectional manner between the HDSM API service 524a, 524b, 524c, 524d and the HDSM configuration file 526a, 526b, 526c, 526d, respectively. Data from the HDSM configuration file 526a, 526b, 526c, 526d may flow to the session manager 528a, 528b, 528c, 528d, respectively. Data may flow in a bidirectional manner between the HDSM broker robot 530a, 530b, 530c, 530d and the HDSM API service 524a, 524b, 524c, 524d, respectively. Data may also flow in a bidirectional manner between the HDSM broker robot 530a, 530b, 530c, 530d and the session manager 528a, 528b, 528c, 528d, respectively.

As illustrated in FIG. 5, according to exemplary embodiments, although in server A 522a, only four sessions (session 1, session 2, session 3, and session 4) are running, the disclosure is not limited thereto. Any number of sessions may run in server A 522a based on user's demand without departing from the scope of the instant disclosure.

Similarly, according to exemplary embodiments, although in server B 522a, only two sessions (session 1, and session 2) are running, the disclosure is not limited thereto. Any number of sessions may run in server B 522b based on user's demand without departing from the scope of the instant disclosure.

According to exemplary embodiments, although in server C 522c, only four sessions (session 1, session 2, session 3, and session 4) are running, the disclosure is not limited thereto. Any number of sessions may run in the server C 522c based on user's demand without departing from the scope of the instant disclosure.

According to exemplary embodiments, although in server D 522d, only three sessions (session 1, session 2, and session 3) are running, the disclosure is not limited thereto. Any number of sessions may run in server D 522d based on user's demand without departing from the scope of the instant disclosure.

According to exemplary embodiments, each of the creating module 414, accessing module 416, retrieving module 418, executing module 420, monitoring module 422, receiving module 424, adding module 426, detecting module 428, storing module 430, and the communication module 432 of the HDSMM 406 as illustrated in FIG. 4 and each of the HDSM health monitor module 508, HDSM Restful service module 510, HDSM log module 514 of the HDSM master 506 as illustrated in FIG. 5 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the creating module 414, accessing module 416, retrieving module 418, executing module 420, monitoring module 422, receiving module 424, adding module 426, detecting module 428, storing module 430, and the communication module 432 of the HDSMM 406 as illustrated in FIG. 4 and each of the HDSM health monitor module 508, HDSM Restful service module 510, HDSM log module 514 of the HDSM master 506 as illustrated in FIG. 5 may be implemented by microprocessors or similar, and may be programmed using software (e.g., microcode) to perform various functions discussed herein and may optionally be driven by firmware and/or software.

Alternatively, according to exemplary embodiments, each of the creating module 414, accessing module 416, retrieving module 418, executing module 420, monitoring module 422, receiving module 424, adding module 426, detecting module 428, storing module 430, and the communication module 432 of the HDSMM 406 as illustrated in FIG. 4 and each of the HDSM health monitor module 508, HDSM Restful service module 510, HDSM log module 514 of the HDSM master 506 as illustrated in FIG. 5 may be implemented by dedicated hardware, or as a combination of dedicated hardware to perform some functions and a processor (e.g., one or more programmed microprocessors and associated circuitry) to perform other functions.

According to exemplary embodiments, each of the creating module 414, accessing module 416, retrieving module 418, executing module 420, monitoring module 422, receiving module 424, adding module 426, detecting module 428, storing module 430, and the communication module 432 of the HDSMM 406 as illustrated in FIG. 4 and each of the HDSM health monitor module 508, HDSM Restful service module 510, HDSM log module 514 of the HDSM master 506 as illustrated in FIG. 5 may be called via corresponding API.

The process may be executed via the communication module 432 and the communication network 410, which may comprise plural networks as described above. For example, in an exemplary embodiment, the various components of the HDSMM 406 and the HDSM manager system 504 may communicate with the server 404, and the database(s) 412, 512 via the communication module 432 and the communication network 410. Of course, these embodiments are merely exemplary and are not limiting or exhaustive.

According to exemplary embodiments, the communication network 410 and the communication module 432 may be configured to establish a link between the database(s) 412, 512 the client devices 408(1)-408(n) and the HDSMM 406 and the HDSM system 504.

Referring to FIGS. 4 and 5, according to exemplary embodiments, the creating module 414 may be configured to create a master session in response to receiving login input data from a high density session manager master module (i.e., the HDSM master 506).

According to exemplary embodiments, the accessing module 416 may be configured to access, in response to creating the master session, the configuration database (i.e., database (s) 412, 512) that stores configuration file and logging information data corresponding to a plurality of child sessions (may also be referred to as HDSM broker sessions, or simply just sessions) each including corresponding functional user identifier (ID).

According to exemplary embodiments, the retrieving module 418 may be configured to retrieve the configuration file and logging information data from the configuration database (i.e., database (s) 412, 512).

According to exemplary embodiments, the creating module 414 may be further configured to dynamically create, based on the retrieved configuration file and log information data, multiple simultaneous and interactive server sessions (i.e., session 1, session 2, session 3, session 4, etc.) among the plurality of child sessions.

According to exemplary embodiments, the executing module 420 may be configured to run the dynamically created multiple simultaneous and interactive server sessions on a single server. Each server session may be running with a separately logged in functional user ID. For example, the executing module 420 may be configured to run the dynamically created session 1, session 2, session 3, and session 4 on the single server A 522a with a separately logged in corresponding functional user ID; run the dynamically created session 1 and session 2 on the single server B 522b with a separately logged in corresponding functional user ID; run the dynamically created session 1, session 2, session 3, and session 4 on the single server C 522c with a separately logged in corresponding functional user ID; and run the dynamically created session 1, session 2, and session 3 on the single server D 522d with a separately logged in corresponding functional user ID, but the disclosure is not limited thereto.

According to exemplary embodiments, the monitoring module 422, 508 may be configured to monitor health of each server session running on the single server. For example, the HDSM health monitor module 422, 508 may simultaneously monitor health of dynamically created session 1, session 2, session 3, and session 4 running on the single server A 522a; health of dynamically created session 1 and session 2 running on the single server B 522b; monitor dynamically created session 1, session 2, session 3, and session 4 running on the single server C 522c; and monitor dynamically created session 1, session 2, and session 3 on the single server D 522d, but the disclosure is not limited thereto.

According to exemplary embodiments, the creating module 414 may be configured to create the multiple simultaneous and interactive server sessions in a manner such that a plurality of software robots can run on the single server at the same time.

According to exemplary embodiments, the creating module 414 may be configured to create the multiple simultaneous and interactive server sessions in a manner such that all created server sessions are capable of simultaneously running one or more non-conflicting software robots.

According to exemplary embodiments, the receiving module 424 may be configured to receive a user input to add a new server session; dynamically create the new server session in response to receiving the user input; and add the newly created server session on the single server on which the previously created multiple simultaneous and interactive server sessions are already running.

According to exemplary embodiments, in dynamically creating multiple simultaneous and interactive server sessions, the crating module 414 may be configured to create a loop-back internet protocol (IP) address session on the same single server by causing the HDSM master module (i.e., HDSM master 506) implement remote desktop protocol itself without utilizing other jump host servers.

According to exemplary embodiments, the health of each server session includes connection status, and the session manager 528a, 528b, 528c, 528d may constantly monitor connection status of corresponding server session among the multiple simultaneous and interactive server sessions within a predefined timeframe. The detecting module 428 may detect, in response to monitoring, a disconnected session. And the creating module 414 may automatically recreate the disconnected session upon detection of disconnected status based on the retrieved configuration file data and logging information data.

According to exemplary embodiments, the HDSMM 406 may be configured to monitor, by utilizing the HDSM health monitor module 508, connection status of each server session among the multiple simultaneous and interactive server sessions; retrieve, by utilizing the HDSM RESTful service module 510, the configuration file from the configuration database (i.e., database(s) 412, 512); store operation logs received from the HDSM log module 514 onto a central database (not shown); and store server specific configuration file (e.g., configuration file A corresponding to server A 522a; configuration file B corresponding to server B 522b; configuration file C corresponding to server C 522c; configuration file D corresponding to server D 522d) onto the backup file system 516 configured for consumed by the HDSM health monitor module 508.

According to exemplary embodiments, the HDSMM 406 can configure a session manager with self-healing feature to auto initiate lost session; execute high density session manager RESTful service for dynamic high density session configuration; execute high density session manager application programming interface (API) for configuration management; execute self-service web portal to onboard new servers and monitor key performance indicators (KPIs); execute high density session manager logger to collect vital statistics and exceptions; execute high density session manager database objects for persistent state data, etc.

According to exemplary embodiments, the architecture 500 of the high density session manager module as illustrated in FIG. 5 may be designed in a manner such that the architecture supports fault tolerant design with service oriented architecture and such that micro-services may be utilized by other applications and tools.

According to exemplary embodiments, the HDSMM 406 may configured for vertical scaling, e.g., initiating multiple concurrent interaction Windows sessions; dynamically adding and removing session based on a central configuration; implementing micro-service and API architecture so that configuration may be provided dynamically via on-demand RESTful API calls; configuring self-service management portal, e.g., self-service on-boarding and off-boarding via HDSM Web; configuring component and service level resiliency design with auto failover feature; providing self-healing and auto session recovery feature, e.g., sessions are recovered from session snatching and outages; integrating with other applications, e.g., CI/CD (continuous integration/continuous development) pipeline, monitoring systems, etc., but the disclosure is not limited thereto.

According to exemplary embodiments, the HDSMM 406 may be configured for providing security and role based access, e.g., active directory authentication and integrating with password and identity database for credentials; and providing component level logging capabilities feeding to the HDSM master 506.

Figure 6:
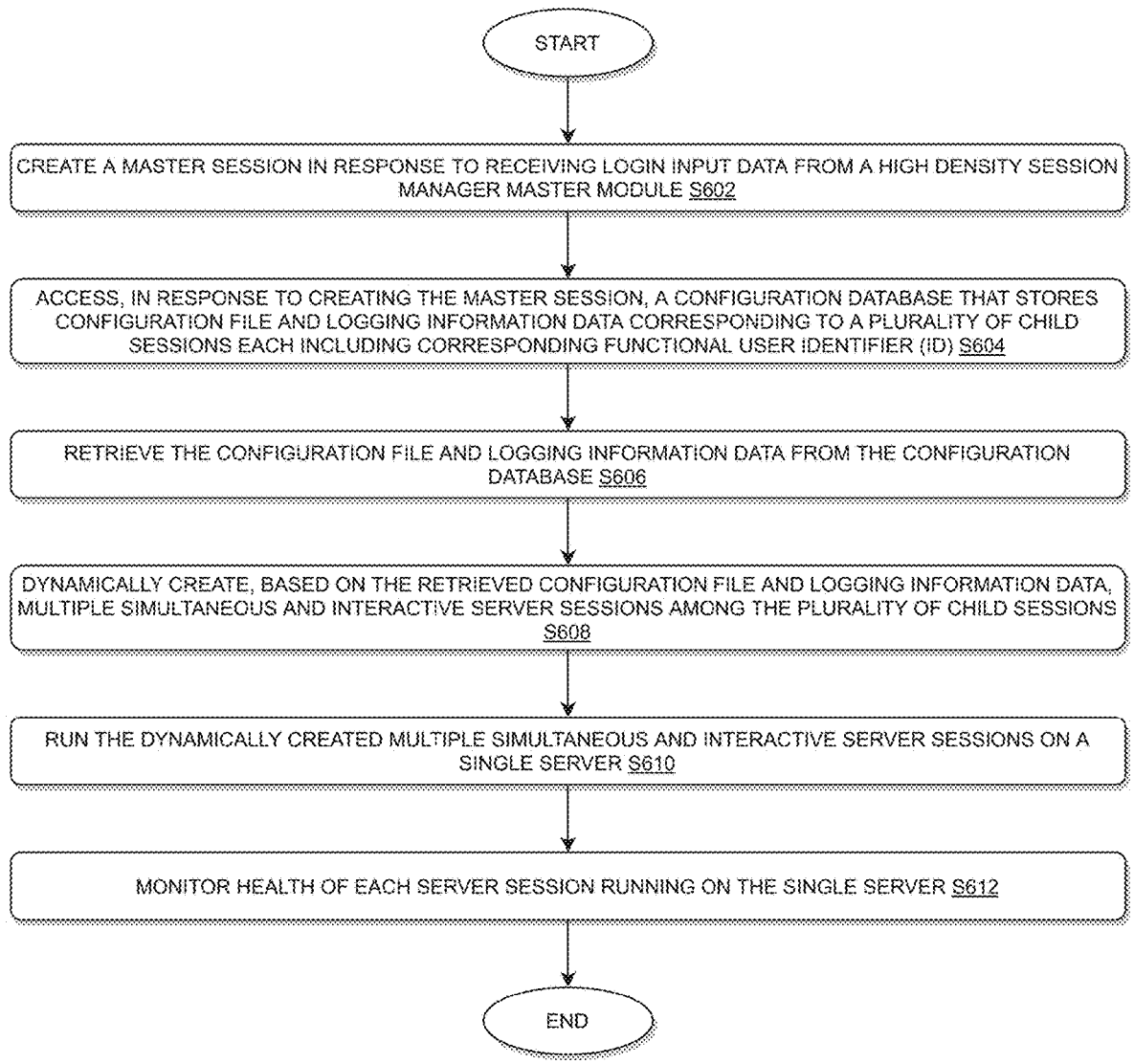
FIG. 6 illustrates a flow chart of a process implemented by high density session management module of FIG. 4 in accordance with an exemplary embodiment.

FIG. 6 illustrates a flow chart of a process 600 for implementing the HDSMM 406 or the HDSM system 504 that provides a platform for creating multiple concurrent interactive sessions so that multiple BOTS can run on a single server at the same time in accordance with an exemplary embodiment. It will be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include creating a master session in response to receiving login input data from a high density session management master module.

At step S604, the process 600 may include accessing, in response to creating the master session, a configuration database that stores configuration file and logging information data corresponding to a plurality of child sessions each including corresponding functional user identifier (ID).

At step S606, the process 600 may include retrieving the configuration file and logging information data from the configuration database.

At step S608, the process 600 may include dynamically creating, based on the retrieved configuration file and logging information data, multiple simultaneous and interactive server sessions among the plurality of child sessions.

At step S610, the process 600 may include running the dynamically created multiple simultaneous and interactive server sessions on a single server, wherein each server session is running with a separately logged in functional user ID.

At step S612, the process 600 may include monitoring health of each server session running on the single server.

According to exemplary embodiments, the process 600 may further include creating the multiple simultaneous and interactive server sessions in a manner such that a plurality of software robots can run on the single server at the same time.

According to exemplary embodiments, the process 600 may further include: creating the multiple simultaneous and interactive server sessions in a manner such that all created server sessions are capable of simultaneously running one or more non-conflicting software robots.

According to exemplary embodiments, the process 600 may further include: receiving a user input to add a new server session; dynamically creating the new server session in response to receiving the user input; and adding the newly created server session on the single server one which the previously created multiple simultaneous and interactive server sessions are already running.

According to exemplary embodiments, in dynamically creating multiple simultaneous and interactive server sessions, the process 600 may further include: creating a loop-back internet protocol (IP) address session on the same single server by causing the high density session management master module implement remote desktop protocol itself without utilizing other jump host servers.

According to exemplary embodiments, the health of each server session may include connection status, and the process 600 may further include: constantly monitoring connection status of each server session among the multiple simultaneous and interactive server sessions within a predefined timeframe; detecting, in response to monitoring, a disconnected session; and automatically recreating the disconnected session upon detection of disconnected status based on the retrieved configuration file data and logging information data.

According to exemplary embodiments, the high density session management master module may include the configuration database, a health monitor module, a RESTful service module, and a backup file system, and the process 600 may further include: monitoring, by utilizing the health monitor module, connection status of each server session among the multiple simultaneous and interactive server sessions; retrieving, by utilizing RESTful service module, the configuration file from the configuration database; storing operation logs received from a logger service module onto a central database; and storing server specific configuration file onto the backup file system configured for consumed by the health monitor module.

According to exemplary embodiments, the HDSMD 402 may include a memory (e.g., a memory 106 as illustrated in FIG. 1) which may be a non-transitory computer readable medium that may be configured to store instructions for implementing the HDSMM 406 or the HDSM system 504 that provides a platform for creating multiple concurrent interactive sessions so that multiple BOTS can run on a single server at the same time as disclosed herein. The HDSMD 402 may also include a medium reader (e.g., a medium reader 112 as illustrated in FIG. 1) which may be configured to read any one or more sets of instructions, e.g., software, from any of the memories described herein. The instructions, when executed by a processor embedded within the HDSMM 406, HDSM system 504 or within the HDSMD 402, may be used to perform one or more of the methods and processes as described herein. In a particular embodiment, the instructions may reside completely, or at least partially, within the memory 106, the medium reader 112, and/or the processor 104 (see FIG. 1) during execution by the HDSMD 402.

According to exemplary embodiments, the instructions, when executed, may cause a processor embedded within the HDSMM 406, HDSM system 504, or the HDSMD 402 to perform the following: creating a master session in response to receiving login input data from a high density session manager master module; accessing, in response to creating the master session, a configuration database that stores configuration file and logging information data corresponding to a plurality of child sessions each including corresponding functional user identifier (ID); retrieving the configuration file and logging information data from the configuration database; dynamically creating, based on the retrieved configuration file and logging information data, multiple simultaneous and interactive server sessions among the plurality of child sessions; running the dynamically created multiple simultaneous and interactive server sessions on a single server, wherein each server session is running with a separately logged in functional user ID; and monitoring health of each server session running on the single server. The processor may be the same or similar to the processor 104 as illustrated in FIG. 1 or the processor embedded within HDSMD 202, HDSMD 302, HDSMD 402, HDSMM 406, and the HDSM system 504.

According to exemplary embodiments, the instructions, when executed, may further cause the processor 104 to perform the following: creating the multiple simultaneous and interactive server sessions in a manner such that a plurality of software robots can run on the single server at the same time.

According to exemplary embodiments, the instructions, when executed, may further cause the processor 104 to perform the following: creating the multiple simultaneous and interactive server sessions in a manner such that all created server sessions are capable of simultaneously running one or more non-conflicting software robots.

According to exemplary embodiments, the instructions, when executed, may further cause the processor 104 to perform the following: receiving a user input to add a new server session; dynamically creating the new server session in response to receiving the user input; and adding the newly created server session on the single server one which the previously created multiple simultaneous and interactive server sessions are already running.

According to exemplary embodiments, in dynamically creating multiple simultaneous and interactive server sessions, the instructions, when executed, may further cause the processor 104 to perform the following: creating a loop-back internet protocol (IP) address session on the same single server by causing the high density session manager master module implement remote desktop protocol itself without utilizing other jump host servers.

According to exemplary embodiments, the health of each server session includes connection status, and the instructions, when executed, may further cause the processor 104 to perform the following: constantly monitoring connection status of each server session among the multiple simultaneous and interactive server sessions within a predefined timeframe; detecting, in response to monitoring, a disconnected session; and automatically recreating the disconnected session upon detection of disconnected status based on the retrieved configuration file data and logging information data.

According to exemplary embodiments, the high density session manager master module may include the configuration database, a health monitor module, a RESTful service module, and a backup file system, and the instructions, when executed, may further cause the processor 104 to perform the following: monitoring, by utilizing the health monitor module, connection status of each server session among the multiple simultaneous and interactive server sessions; retrieving, by utilizing RESTful service module, the configuration file from the configuration database; storing operation logs received from the RESTful service module onto the log module; and storing server specific configuration file onto the backup file system configured for consumed by the health monitor module.

According to exemplary embodiments as disclosed above in FIGS. 1-6, technical improvements effected by the instant disclosure may include a platform for implementing platform and language agnostic a high density session manager module for creating multiple concurrent interactive sessions so that multiple software robots (BOTS) can run on a single server at the same time, thereby streamlining the hardware footprint (i.e., reducing the number of servers, maximizing utilization of server CPU and memory, etc., but the disclosure is not limited thereto), reducing the time to market an application, building a scalable on-demand infrastructure, and reducing the costs of robotic process automation, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a high density session manager module by utilizing one or more processors and one or more memories, the method comprising:

creating a master session in response to receiving login input data from a high density session manager master module, wherein the high density session manager master module configures a session manager with self-healing feature to auto initiate lost session; executes high density session manager RESTful service for dynamic high density session configuration; executes high density session manager application programming interface for configuration management; executes self-service web portal to onboard new servers and monitor key performance indicators; executes high density session manager logger to collect vital statistics and exceptions; and executes high density session manager database objects for persistent state data;

accessing, in response to creating the master session, a configuration database that stores configuration file and logging information data corresponding to a plurality of child sessions each including corresponding functional user identifier (ID);

retrieving the configuration file and logging information data from the configuration database;

dynamically creating, based on the retrieved configuration file and logging information data, multiple simultaneous and interactive server sessions among the plurality of child sessions;

running the dynamically created multiple simultaneous and interactive server sessions on a single server, wherein each server session is running with a separately logged in functional user ID; and monitoring health of each server session running on the single server.

2. The method according to claim 1, further comprising:

creating the multiple simultaneous and interactive server sessions in a manner such that a plurality of software robots can run on the single server at the same time.

3. The method according to claim 2, further comprising:

creating the multiple simultaneous and interactive server sessions in a manner such that all created server sessions are capable of simultaneously running one or more non-conflicting software robots.

4. The method according to claim 1, further comprising:

receiving a user input to add a new server session;

dynamically creating the new server session in response to receiving the user input; and adding the newly created server session on the single server on which the previously created multiple simultaneous and interactive server sessions are already running.

5. The method according to claim 1, wherein, in dynamically creating multiple simultaneous and interactive server sessions, the method further comprising:

using a loop-back internet protocol (IP) address session on the same single server by causing the high density session manager master module implement remote desktop protocol itself without utilizing other jump host servers.

6. The method according to claim 1, wherein the health of each server session includes connection status, and the method further comprising:

constantly monitoring connection status of each server session among the multiple simultaneous and interactive server sessions within a predefined timeframe;

detecting, in response to monitoring, a disconnected session; and automatically recreating the disconnected session upon detection of disconnected status based on the retrieved configuration file data and logging information data.

7. The method according to claim 1, wherein the high density session manager master module includes the configuration database, a health monitor module, a RESTful service module, and a backup file system, and the method further comprising:

monitoring, by utilizing the health monitor module, connection status of each server session among the multiple simultaneous and interactive server sessions;

retrieving, by utilizing RESTful service module, the configuration file from the configuration database;

storing operation logs received from a logger service module onto a central database; and storing server specific configuration file onto the backup file system configured for consumption by the health monitor module.

8. A system for implementing a high density session manager module, the system comprising:
a processor; and
a memory operatively connected to the processor via a communication interface, the memory storing computer readable instructions, when executed, causes the processor to:
create a master session in response to receiving login input data from a high density session manager master module, wherein the high density session manager master module configures a session manager with self-healing feature to auto initiate lost session; executes high density session manager RESTful service for dynamic high density session configuration; executes high density session manager application programming interface for configuration management; executes self-service web portal to onboard new servers and monitor key performance indicators; executes high density session manager logger to collect vital statistics and exceptions; and executes high density session manager database objects for persistent state data;
access, in response to creating the master session, a configuration database that stores configuration file and logging information data corresponding to a plurality of child sessions each including corresponding functional user identifier (ID);
retrieve the configuration file and logging information data from the configuration database;
dynamically create, based on the retrieved configuration file and log information data, multiple simultaneous and interactive server sessions among the plurality of child sessions;
run the dynamically created multiple simultaneous and interactive server sessions on a single server, wherein each server session is running with a separately logged in functional user ID; and
monitor health of each server session running on the single server.

9. The system according to claim 8, wherein the processor is further configured to:
create the multiple simultaneous and interactive server sessions in a manner such that a plurality of software robots can run on the single server at the same time.

10. The system according to claim 9, wherein the processor is further configured to:
create the multiple simultaneous and interactive server sessions in a manner such that all created server sessions are capable of simultaneously running one or more non-conflicting software robots.

11. The system according to claim 8, wherein the processor is further configured to:
receive a user input to add a new server session;
dynamically create the new server session in response to receiving the user input; and
add the newly created server session on the single server on which the previously created multiple simultaneous and interactive server sessions are already running.

12. The system according to claim 8, wherein, in dynamically creating multiple simultaneous and interactive server sessions, the processor is further configured to:
use a loop-back internet protocol (IP) address session on the same single server by causing the high density session manager master module implement remote desktop protocol itself without utilizing other jump host servers.

13. The system according to claim 8, wherein the health of each server session includes connection status, and the processor is further configured to:
constantly monitor connection status of each server session among the multiple simultaneous and interactive server sessions within a predefined timeframe;
detect, in response to monitoring, a disconnected session; and
automatically recreate the disconnected session upon detection of disconnected status based on the retrieved configuration file data and logging information data.

14. The system according to claim 8, wherein the high density session manager master module includes the configuration database, a health monitor module, a RESTful service module, and a backup file system, and the processor is further configured to:
monitor, by utilizing the health monitor module, connection status of each server session among the multiple simultaneous and interactive server sessions;
retrieve, by utilizing RESTful service module, the configuration file from the configuration database;
store operation logs received from a logger service module onto a central database; and
store server specific configuration file onto the backup file system configured for consumption by the health monitor module.

15. A non-transitory computer readable medium configured to store instructions for implementing a high density session manager module, wherein, when executed, the instructions cause a processor to perform the following:
creating a master session in response to receiving login input data from a high density session manager master module, wherein the high density session manager master module configures a session manager with self-healing feature to auto initiate lost session; executes high density session manager RESTful service for dynamic high density session configuration; executes high density session manager application programming interface for configuration management; executes self-service web portal to onboard new servers and monitor key performance indicators; executes high density session manager logger to collect vital statistics and exceptions; and executes high density session manager database objects for persistent state data;
accessing, in response to creating the master session, a configuration database that stores configuration file and logging information data corresponding to a plurality of child sessions each including corresponding functional user identifier (ID);
retrieving the configuration file and logging information data from the configuration database;
dynamically creating, based on the retrieved configuration file and logging information data, multiple simultaneous and interactive server sessions among the plurality of child sessions;
running the dynamically created multiple simultaneous and interactive server sessions on a single server, wherein each server session is running with a separately logged in functional user ID; and
monitoring health of each server session running on the single server.

16. The non-transitory computer readable medium according to claim 15, wherein, when executed, the instructions further cause the processor to perform the following:
creating the multiple simultaneous and interactive server sessions in a manner such that a plurality of software robots can run on the single server at the same time.

17. The non-transitory computer readable medium according to claim 16, wherein, the instructions, when executed, further cause the processor to perform the following:

creating the multiple simultaneous and interactive server sessions in a manner such that all created server sessions are capable of simultaneously running one or more non-conflicting software robots.

18. The non-transitory computer readable medium according to claim 15, wherein, the instructions, when executed, further cause the processor to perform the following:

receiving a user input to add a new server session;

dynamically creating the new server session in response to receiving the user input; and adding the newly created server session on the single server on which the previously created multiple simultaneous and interactive server sessions are already running.

19. The non-transitory computer readable medium according to claim 15, wherein, in dynamically creating multiple simultaneous and interactive server sessions, the instructions, when executed, further cause the processor to perform the following:

using a loop-back internet protocol (IP) address session on the same single server by causing the high density session manager master module implement remote desktop protocol itself without utilizing other jump host servers.

20. The non-transitory computer readable medium according to claim 15, wherein the health of each server session includes connection status, and the instructions, when executed, further cause the processor to perform the following:

constantly monitoring connection status of each server session among the multiple simultaneous and interactive server sessions within a predefined timeframe;

detecting, in response to monitoring, a disconnected session; and automatically recreating the disconnected session upon detection of disconnected status based on the retrieved configuration file data and logging information data.

* * * * *